United States Patent
He et al.

(10) Patent No.: US 10,325,507 B2
(45) Date of Patent: Jun. 18, 2019

(54) METHOD AND SYSTEM FOR DETERMINING EFFECTIVE APPROACH ANGLE AND PREDICTING AIRCRAFT LANDING DISTANCE

(71) Applicant: HONEYWELL INTERNATIONAL INC., Morris Plains, NJ (US)

(72) Inventors: Gang He, Morristown, NJ (US); Steve Johnson, North Bend, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 220 days.

(21) Appl. No.: 15/287,276

(22) Filed: Oct. 6, 2016

(65) Prior Publication Data

US 2018/0102059 A1    Apr. 12, 2018

(51) Int. Cl.
*G08G 5/02*    (2006.01)
*B64D 45/00*    (2006.01)
*G05D 1/04*    (2006.01)
*G08G 5/00*    (2006.01)
*G05D 1/06*    (2006.01)

(52) U.S. Cl.
CPC .......... *G08G 5/025* (2013.01); *B64D 45/00* (2013.01); *G05D 1/042* (2013.01); *G08G 5/0021* (2013.01); *G08G 5/02* (2013.01); *G05D 1/0676* (2013.01)

(58) Field of Classification Search
None
See application file for complete search history.

(56) References Cited

U.S. PATENT DOCUMENTS

| | | | |
|---|---|---|---|
| 3,052,427 A | | 9/1962 | Match et al. |
| 3,266,039 A | * | 8/1966 | Sylvander ................ G01S 5/08 244/187 |
| 3,309,707 A | | 3/1967 | Tatz et al. |

(Continued)

FOREIGN PATENT DOCUMENTS

| | | | |
|---|---|---|---|
| EP | 0372660 A2 | * 6/1990 | ........... G05D 1/0676 |
| EP | 0372660 A2 | 6/1990 | |

(Continued)

OTHER PUBLICATIONS

Extended EP Search Report for Application No. 17194654.4 dated Mar. 2, 2018.

*Primary Examiner* — Shelley Chen
(74) *Attorney, Agent, or Firm* — Lorenz & Kopf, LLP

(57) ABSTRACT

A method of predicting a parameter for an aircraft includes detecting an actual approach profile of the aircraft. The actual approach profile includes an actual approach angle. The method also includes comparing, by a processor, the actual approach profile to a predetermined approach profile to determine a difference between the actual and predetermined approach profiles. The predetermined approach profile includes a predetermined approach angle. The method further includes determining, by the processor, an effective approach angle by combining the actual approach angle and the predetermined approach angle according to a factor that varies based on the difference between the actual and predetermined approach profiles. Moreover, the method includes determining, by the processor, the predicted parameter based on the effective approach angle.

15 Claims, 6 Drawing Sheets

(56) References Cited

U.S. PATENT DOCUMENTS

| | | | | |
|---|---|---|---|---|
| 3,519,806 | A | * | 7/1970 | Lami ............... G01S 13/913 |
| | | | | 244/183 |
| 4,012,626 | A | | 3/1977 | Miller et al. |
| 5,003,305 | A | | 3/1991 | Kelly et al. |
| 5,593,114 | A | * | 1/1997 | Ruhl ............... G05D 1/0676 |
| | | | | 244/183 |
| 6,062,513 | A | | 5/2000 | Lambregts |
| 6,577,272 | B1 | * | 6/2003 | Madden ............ G01S 3/50 |
| | | | | 342/387 |
| 2006/0224281 | A1 | * | 10/2006 | Foucart ............ G01C 23/005 |
| | | | | 701/16 |
| 2007/0106433 | A1 | * | 5/2007 | He ................ G01C 23/005 |
| | | | | 701/16 |
| 2009/0048724 | A1 | * | 2/2009 | Caule ............... B64C 25/426 |
| | | | | 701/16 |
| 2009/0195413 | A1 | | 8/2009 | Constans |
| 2011/0025868 | A1 | * | 2/2011 | Tillotson .......... G01N 21/4133 |
| | | | | 348/222.1 |
| 2015/0307207 | A1 | * | 10/2015 | Meunier ............ G08G 5/02 |
| | | | | 701/4 |

FOREIGN PATENT DOCUMENTS

| | | | | |
|---|---|---|---|---|
| EP | 0372660 | A3 | * | 7/1991 ........... G05D 1/0676 |
| EP | 0882213 | A1 | | 12/1998 |
| GB | 2472311 | A | * | 2/2011 ......... G01N 21/4133 |
| JP | 10111645 | A | * | 4/1998 |
| JP | 2002092799 | A | * | 3/2002 |

\* cited by examiner

METHOD AND SYSTEM FOR DETERMINING EFFECTIVE APPROACH ANGLE AND PREDICTING AIRCRAFT LANDING DISTANCE

TECHNICAL FIELD

The present disclosure generally relates to an aircraft and, more particularly, relates to a method and system for determining an effective approach angle and predicting an aircraft landing distance.

BACKGROUND

An aircraft flight and landing includes a number of different phases. Taxi, takeoff, cruise, approach, and landing phases each involve a number of important processes. Approach and landing, in particular, involves a number of steps. For example, the pilot or other personnel controls the aircraft to reduce its speed, altitude, etc. Air traffic control and related personnel also perform various tasks related to the approach and landing phases. In addition, computerized tools can be used to perform various functions related to the approach and landing.

These approach and landing procedures, tasks, functions, etc. often rely upon information about the aircraft that is provided to the pilot, crew, air traffic control, or computerized tool. The accuracy of the data may be compromised for various reasons.

Accordingly, it is desirable to provide a system and a method of providing accurate information for an approach/landing phase of an aircraft. Other desirable features and characteristics of the present disclosure will become apparent from the subsequent detailed description and the appended claims, taken in conjunction with the accompanying drawings and the foregoing technical field and background.

BRIEF SUMMARY

In one embodiment, a method of predicting a parameter for an aircraft that relates to an approach and/or a landing of the aircraft is disclosed. The method includes detecting an actual approach profile of the aircraft. The actual approach profile includes an actual approach angle. The method also includes comparing, by a processor, the actual approach profile to a predetermined approach profile to determine a difference between the actual and predetermined approach profiles. The predetermined approach profile includes a predetermined approach angle. The method further includes determining, by the processor, an effective approach angle by combining the actual approach angle and the predetermined approach angle according to a factor that varies based on the difference between the actual and predetermined approach profiles. Moreover, the method includes determining, by the processor, the predicted parameter based on the effective approach angle.

In another embodiment, a system for predicting a parameter for an aircraft is disclosed, where the parameter relates to an approach and/or a landing of the aircraft. The system includes an avionics system configured to detect an actual approach profile of the aircraft. The actual approach profile includes an actual approach angle. The system also includes a processor that is configured to compare the actual approach profile to a predetermined approach profile to determine a difference between the actual and predetermined approach profiles. The predetermined approach profile includes a predetermined approach angle. The processor is further configured to determine an effective approach angle for the aircraft by combining the actual approach angle and the predetermined approach angle according to a factor that varies based on the difference between the actual and predetermined approach profiles. The processor is additionally configured to determine the predicted parameter based on the effective approach angle.

In an additional embodiment, a method of predicting a landing distance of an aircraft is disclosed. The parameter relates to an approach and/or a landing of the aircraft. The method includes detecting an actual approach profile of the aircraft. The actual approach profile includes an actual approach angle. The method further includes comparing, by a processor, the actual approach profile to a predetermined approach profile to determine a difference between the actual and predetermined approach profiles. The predetermined approach profile includes a predetermined approach angle. Moreover, the method includes determining, by the processor, an effective approach angle for the aircraft based on both the actual approach angle and the predetermined approach angle. Furthermore, the method includes determining, by the processor, the predicted landing distance based on the effective approach angle. Determining the effective approach angle includes determining the effective approach angle T according to "$T=(1-B)\,T_{nominal}+B\,T_{actual}$" wherein B is a variable factor, $T_{nominal}$ is the predetermined approach angle, and $T_{actual}$ is the actual approach angle. The processor determines the variable factor according to the difference between the actual and predetermined approach profiles.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
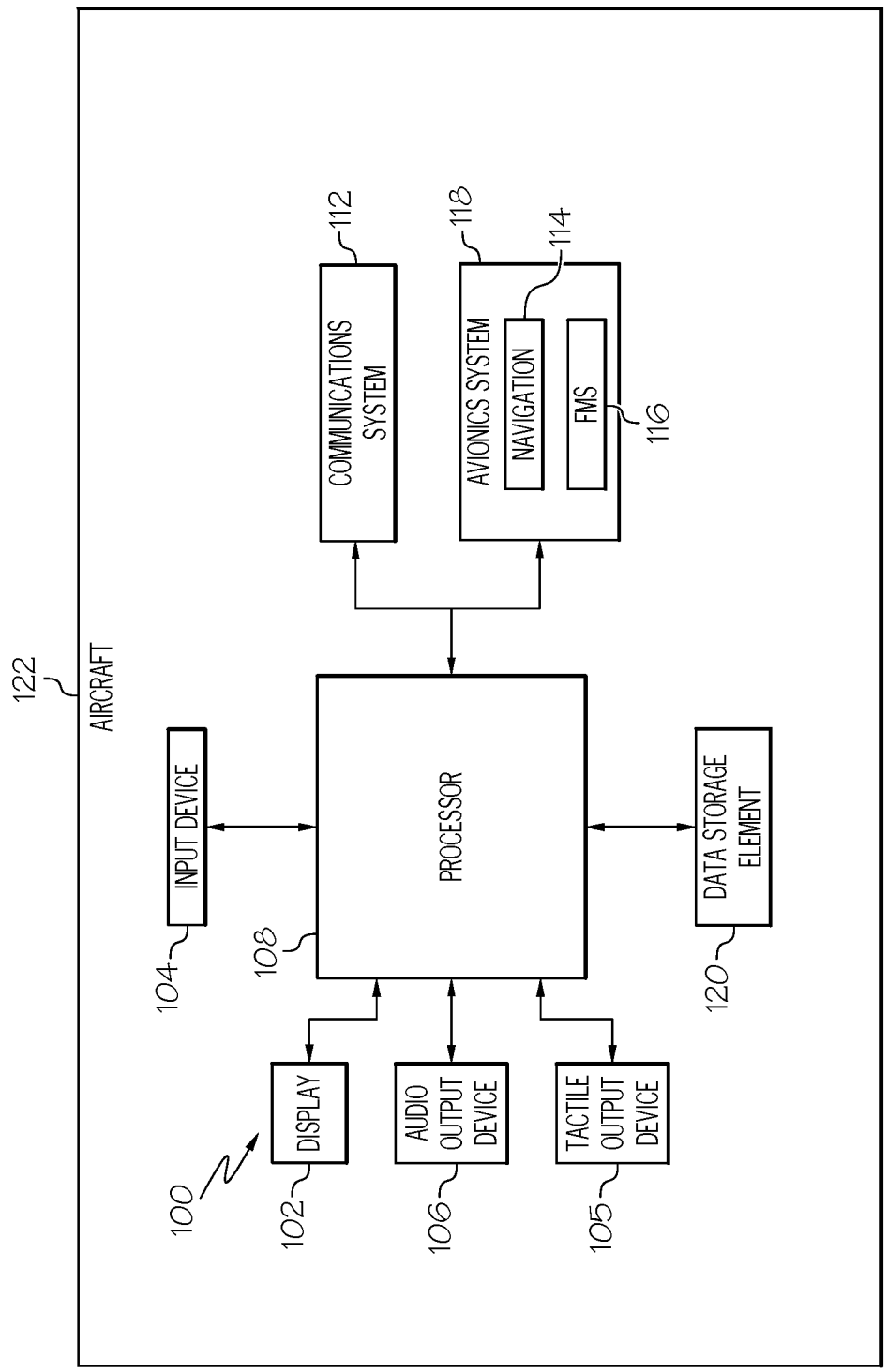
FIG. 1 is a block diagram of a system suitable for use in an aircraft in accordance with one embodiment.

The following detailed description is merely exemplary in nature and is not intended to limit the present disclosure or the application and uses of the present disclosure. Furthermore, there is no intention to be bound by any theory presented in the preceding background or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

In addition, those skilled in the art will appreciate that embodiments of the present disclosure may be practiced in conjunction with any method and/or system for determining an effective glide slope for an aircraft landing distance computation. It will also be appreciated that the methods and systems for determining an effective glide slope is merely exemplary and configured according to the present disclosure. Further, it should be noted that many alternative or additional functional relationships or physical connections may be present in an embodiment of the present disclosure. In addition, while the figures shown herein depict examples with certain arrangements of elements, additional intervening elements, devices, features, or components may be present in an actual embodiment.

FIG. 1 depicts an exemplary embodiment of a system 100, which is associated with an aircraft 122. In an exemplary embodiment, the system 100 includes, without limitation, an input device 104, a processor 108, a communications system 112, a data storage element 120, one or more avionics systems 118, and one or more output devices 102, 105, 106 suitably configured to support operation of the system 100 as described in greater detail below. In the illustrated embodiment, the avionics system 118 includes and/or is associated with a navigation system 114 and a flight management system 116. Also, in the illustrated embodiment, the output devices include a visual output device, such as a display 102, an audio output device 106, and a tactile output device 105.

It should be understood that FIG. 1 is a simplified representation of the system 100 for purposes of explanation and ease of description, and FIG. 1 is not intended to limit the application or scope of the subject matter in any way. Practical embodiments of the system 100 may vary from the illustrated embodiment without departing from the scope of the present disclosure. Also, the system 100 may include numerous other devices and components for providing additional functions and features, as will be appreciated in the art. Moreover, it should be appreciated that although FIG. 1 shows the system 100 as being located within the aircraft 122, in practice, one or more components of the system 100 may be located outside the aircraft 122 (e.g., on the ground as part of an air traffic control center or another command center such as a remote control system) and communicatively coupled to the remaining elements of the system 100 (e.g., via a data link of the communications).

The processor 108 generally represents the hardware, software, and/or firmware components configured to facilitate communications and/or interaction between the input device 104, the output device(s) 102, 105, 106, and the other elements of the system 100. The processor 108 may also perform additional tasks and/or functions described in greater detail below. Depending on the embodiment, the processor 108 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 108 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processor 108, or in any practical combination thereof. In some embodiments, the features and/or functionality of the processor 108 may be implemented as part of the flight management system 116 or another avionics system 118, as will be appreciated in the art. The processor 108 may be coupled to the navigation system 114 for obtaining real-time navigational data and/or information regarding operation of the aircraft 122 to support operation of the system 100. The processor 108 may also be coupled to the flight management system 116, which in turn, may also be coupled to the navigation system 114, the communications system 112, and one or more additional avionics systems 118 to support navigation, flight planning, and other aircraft control functions, as well as to provide real-time data and/or information regarding operation of the aircraft 122 to the processor 108.

The data storage element 120 may be realized as RAM memory, flash memory, EPROM memory, EEPROM memory, registers, a hard disk, a removable disk, a CD-ROM, or any other form of storage medium known in the art. In this regard, the data storage element 120 can be coupled to the processor 108 such that the processor 108 can read information from, and write information to, the data storage element 120. In the alternative, the data storage element 120 may be integral to the processor 108. As an example, the processor 108 and the data storage element 120 may reside in an ASIC. In practice, a functional or logical module/component of the display 102 might be realized using program code that is maintained in the data storage element 120. Moreover, the data storage element 120 may include and/or access databases suitably configured to support operations of the system 100, such as, for example, a terrain database, an obstacle database, a navigational database, a geopolitical database, a terminal airspace database, a special use airspace database, or other information.

The avionics system 118 may be operable for obtaining and/or providing real-time flight-related information. Accordingly, the avionics system 118 may include one or more sensors that detect this real-time information. Specifically, the avionics system 118 may include an altimeter that detects the current altitude of the aircraft 122. Also, the avionics system 118 may include sensors or other components that detect the current, real-time trajectory of the aircraft 122, the airspeed of the aircraft 122, and/or the approach angle of the aircraft relative to the ground. In some embodiments, the system 100 and/or aircraft 122 may additionally include one or more of the following avionics systems suitably configured to support operation of the aircraft 122: an air traffic management system, a radar system, a traffic avoidance system, an enhanced ground proximity warning system, an autopilot system, an auto-thrust system, a flight control system, a weather system, an electronic flight bag and/or another suitable avionics system.

In an exemplary embodiment, the avionics system 118 may include or may be associated with the navigation system 114. The navigation system 114 is configured to obtain one or more navigational parameters associated with operation of the aircraft 122. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art.

Furthermore, in an exemplary embodiment, the avionics system 118 may include or may be associated with the flight management system 116. In an exemplary embodiment, the flight management system 116 maintains information pertaining to a current flight plan (or alternatively, a current route or travel plan). In accordance with one or more embodiments, the flight management system 116 (or another avionics system 118) is configured to determine, track, or otherwise identify the current operating state (e.g., flight phase or phase of flight) of the aircraft 122, as described in greater detail below. Various phases of flight are well known (e.g., a standing phase, a pushback or towing phase, a taxiing phase, a takeoff phase, a climbing phase, a cruising phase, a descent phase, an approach phase, a landing phase, and the like) and will not be described in detail herein. It should be noted that the phases of flight may be combined and/or categorized in numerous possible manners and/or each phase of flight may comprise numerous sub-phases (for example, an approach phase may include sub-phases for holding, procedure turn, flyover, orbit, and the like), and the subject matter is not intended to be limited to any particular number and/or classification of flight phases. In addition to delineated flight phases, the flight management system 116 may identify other operating states of the aircraft 122, such as, for example, operation with one or more engines disabled, operation when afterburners onboard the aircraft 122 are being utilized, transonic and/or supersonic operation of the aircraft 122, and the like. In reality, the flight phases may not necessarily be entirely distinct from each other, and one phase may overlap with one another.

The methods and system of the present disclosure may be used in relation to the descent phase (from cruise altitude to initial approach), the approach phase, and the landing phase of a flight. Certain features of the present disclosure may be discussed below in relation to one phase; however, it will be appreciated that those features may relate to the one or more of the other phases. Thus, for purposes of discussion, the descent, approach, and landing phases will be collectively referred to as the "final phase" of the flight.

In an exemplary embodiment, the communications system 112 is coupled to the processor 108 and configured to support communications to and/or from the aircraft 122, as will be appreciated in the art. In this regard, the communications system 112 may be realized using a radio communication system or another suitable data link system. In an exemplary embodiment, the communications system 112 is suitably configured to support communications between the aircraft 122 and another aircraft or ground location (e.g., air traffic control equipment and/or personnel).

The input device 104 may include, for example, a control joystick, a keyboard, a pointer device, a touch screen, a microphone, an electronic flight bag, a portable electronic device, and/or another device that allows the user to input information into the system 100. In some embodiments, the input device 104 may include more than one type of input element. Furthermore, in some embodiments, the input device 104 may be used by the pilot, for example, to control the aircraft 122 (e.g., to change the aircraft's speed, trajectory, etc.). In other embodiments, the system 100 may not include any input device 104, and/or the input device 104 may only be used to override automated functions of the system 100. In an exemplary embodiment, the input device 104 is coupled to and in communication with the processor 108 over a suitable architecture that supports the transfer of data, commands, power, etc. Additionally, the input device 104 and the processor 108 are cooperatively configured to allow a user to interact with other elements of system 100 by providing an input to the input device 104.

As stated, the system 100 may include one or more output devices, such as a display 102 (i.e., visual output device), an audio output device 106, and a tactile output device 105. The display 102, audio output device 106, and tactile output device 105 may be coupled to the processor 108 over a suitable architecture that enables the transfer of data, commands, power, etc. It will be appreciated that these are example output devices of the system 100 and that the system 100 could include different output devices without departing from the scope of the present disclosure.

In some embodiments, the audio output device 106 may include a speaker. As such, the audio output device 106 may selectively output an audible sound based on control signals from the processor 108.

Furthermore, the tactile output device 105 may include a surface that selectively vibrates in some embodiments. In some embodiments, the tactile output device 105 may receive control signals from the processor 108 such that the tactile output device 105 vibrates, and those vibrations may be felt by the user. The tactile output device 105 may be incorporated into and/or associated with the input device 104. For example, if the input device 104 is a joystick used to control the aircraft 122, the output device 105 may be included on the joystick such that any tactile output may be felt by the pilot while controlling the aircraft 122.

The display 102 may be a visual output device included in the system 100. It will be appreciated that the system 100 may include a different visual output device, such as a lamp or gauge, without departing from the scope of the present disclosure.

The display 102 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 102 may additionally be implemented as a panel mounted display, a HUD (head-up display) projection, a head-mounted display, a near-to-eye (NTE) display, and/or any one of numerous known technologies. It is additionally noted that the display 102 may be configured as any one of numerous types of aircraft flight deck displays. For example, it may be configured as a multi-function display, a horizontal situation indicator, a vertical situation indicator (VSD), or an interactive navigational display (iNAV). Also, the display 102 may be configured as a primary flight display (PFD). Furthermore, the display 102 may be coupled to the processor 108, and the processor 108 and the display 102 may be cooperatively configured to display, render, or otherwise convey one or more graphical representations or images associated with operation of the aircraft 122 on the display 102. It will be appreciated that although FIG. 1 shows a single display 102, in practice, additional display devices may be included in the system 100.

Figure 2:
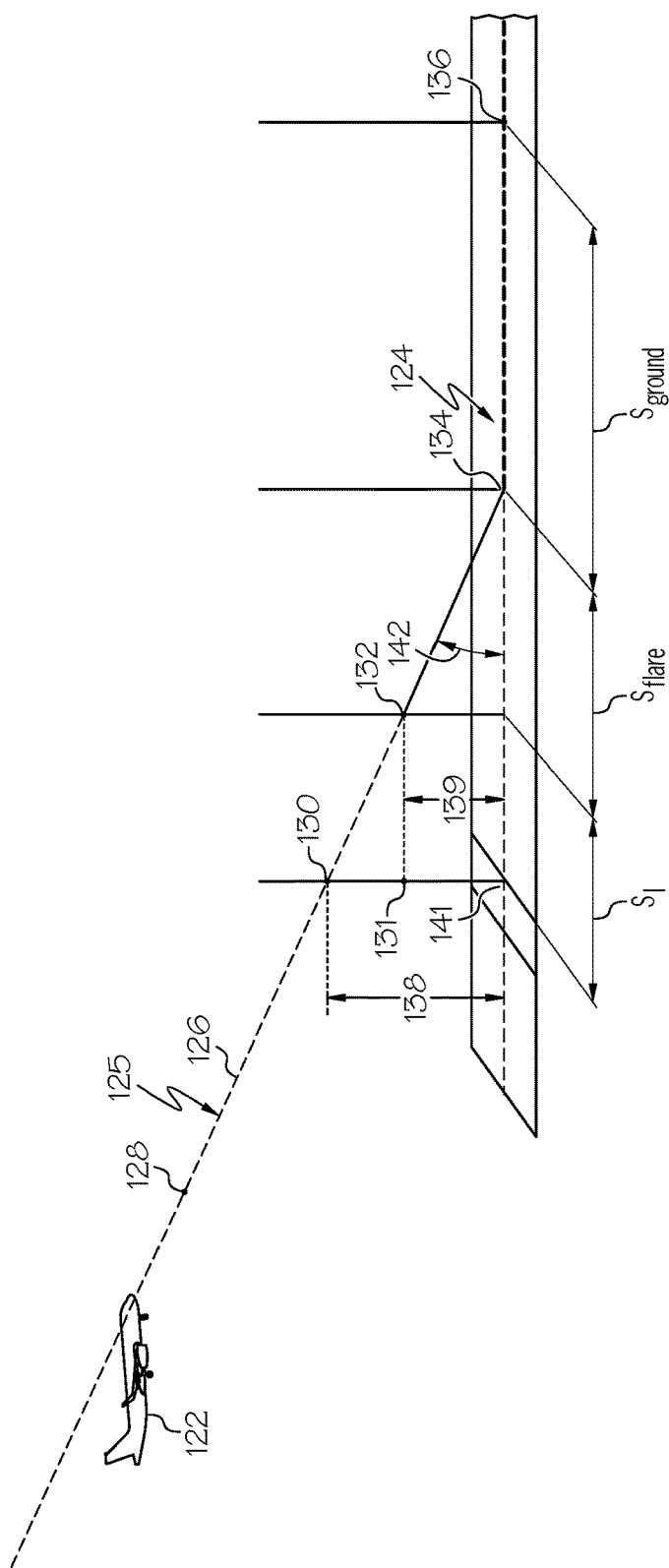
FIG. 2 is a schematic side view showing an aircraft approach and landing on a runway.

Referring now to FIG. 2, the aircraft 122 is shown descending toward a runway 124 along an approach profile, which is represented schematically by line 125. The term "approach profile" as used herein will be interpreted broadly and may include one or more parameters, conditions, or characteristics relating to the aircraft 122 as it proceeds through the final phase (descent, approach, and landing phases) of the flight. The approach profile may be a collection of multiple parameters, conditions, or characteristics of the aircraft. For example, the approach profile may be expressed as the altitude of the aircraft 122, the airspeed of the aircraft 122, flight path of the aircraft 122, and/or the trajectory of the aircraft 122. In FIG. 2, the approach profile 125 includes a flight path 126 of the aircraft 122.

FIG. 2 will be discussed generally in order to explain different events, different reference points, and other features of an example final phase of the flight of the aircraft 122. Movement of the aircraft 122 and other discussions will proceed with reference to a Cartesian coordinate system, wherein the runway 124 defines a generally horizontal plane (e.g., a plane extending along an X-axis and a Y-axis), and wherein a vertical direction extends normal to the runway 124 (e.g., along a Z-axis). This Cartesian coordinate system is but one example coordinate system that can be used and/or referred to when employing the system and method of the present disclosure.

As shown, the aircraft 122 descends along the flight path 126, which in the illustrated embodiment, is a substantially straight line oriented at an approach angle 142 relative to the runway 124. It will be appreciated that this is an example and that other flight paths 126 can be applied to the system and method of the present disclosure.

As the aircraft 122 descends, the aircraft 122 passes through a Missed Approach Point (MAP) 128, a threshold point 130, a flare point 132, a touchdown point 134, and a completion point 136. These points 130 will each be discussed individually in detail below.

The MAP point 128 (or MAPt) is the geographical point at which the pilot or other crewmember decides whether or not to proceed with landing the aircraft 122. It defines the point where the missed approach segment of a predetermined approach procedure begins. The MAP point 128 can be predetermined for both precision approaches (i.e., assisted by instruments) and non-precision approaches (i.e., visual approaches). A pilot may execute a missed approach if a required visual reference (normally the runway 124 or its environment) is not within sight upon reaching the MAP point 128. The MAP point 128 may be predetermined and prescribed by the Federal Aviation Administration (FAA), by air traffic control, or other authority. In some embodiments, the MAP point 128 may be stored in the data storage element 120.

The threshold point 130 may be a geographical point along the flight path 126 that is elevated above a threshold 141 of the runway 124. The threshold point 130 may be elevated a vertical distance 138 above the threshold 141 of the runway 124. It will be appreciated that the threshold 141 is usually the starting point of the runway 124 suitable for landing/touch down, but the threshold 141 may not be the exact start of the runway 124. For example, the threshold 141 may be temporarily shifted for maintenance. The threshold point 130 may be stored in the data storage element 120 in some embodiments. It is noted that some data for the threshold point 130 may be different for different procedures. For example, the height of the threshold point 130 above the threshold 141 may be different for different procedures; however, the latitude and longitude position for the threshold point 130 may be identical for the different procedures.

In the embodiment of FIG. 2, the threshold point 130 of the aircraft 122 is disposed above a predetermined, nominal threshold point 131. The nominal threshold point 131 may be a geographical point that is predetermined by an authority (e.g., the FAA, air traffic control, etc.). In some embodiments, the FAA publishes the nominal threshold point 131 and the vertical distance 139 of the nominal threshold point 131 for storage in the data storage element 120 of the system 100.

The flare point 132 may be the geographical point at which the aircraft 122 is to begin a flare maneuver. During the flare maneuver, the pilot may maneuver the aircraft 122 to slow its speed, for example, by pulling the nose of the aircraft 122 upwards away from the runway 124. The flare point 132 may be elevated a vertical distance 139 above the runway 124. The flare maneuver may continue until the aircraft 122 touches down at the touchdown point 134 on the runway 124. The flare point 132 may be stored in the data storage element 120 in some embodiments.

Upon reaching the touchdown point 134, the aircraft 122 may enter a braking process or braking phase to further slow the aircraft 122 until the completion point 136 is reached. During the braking phase, brakes, spoilers, reversers, and/or other braking equipment may be used to reduce the aircraft's ground speed. At the completion point 136, the braking phase is finished, the landing is completed, and the aircraft 122 is moving slow enough to taxi to a final resting point (not shown).

Now that an example landing of the aircraft 122 has been discussed, operations and methods employed by the system 100 for the landing of the aircraft 122 will be discussed. Generally, the system 100 of FIG. 1 may be used to predict, determine, and/or generate data relating to the final phase of flight (i.e., descent, approach, and/or landing parameters) of the aircraft 122. The system 100 may be used to predict a parameter relating to the approach and/or landing of the aircraft 122. This prediction occurs before the actual landing of the aircraft 122. Thus, this process may be performed as the aircraft 122 is midflight and the landing is being planned.

There are various types of parameters that may be predicted by the system 100. For example, in some embodiments, the system 100 determines an energy state that the aircraft 122 will have during the final phase of flight. Specifically, in some embodiments, the system 100 determines the energy state of the aircraft 122 from the threshold point 130 to the completion point 136. The energy state of an aircraft often corresponds to the location where the aircraft stops along the runway 124. Typically, an aircraft touching down at higher speed will have a longer stopping distance than the same aircraft touching down at lower speed (assuming equal braking is applied to both). As such, the system 100 determines a landing distance of the aircraft 122 from the estimated energy state, which may be used to predict the approach and completion point 136 of the aircraft 122. Furthermore, in some embodiments, the system 100 determines an approach angle of the aircraft 122 for use in determining the landing distance of the aircraft 122.

For the following discussion, it will be assumed that the system 100 is configured to determine and/or predict the landing distance of the aircraft 122. However, it will be appreciated that the system 100 may be configured for determining/predicting additional or different parameters without departing from the scope of the present disclosure.

For example, the processor 108 calculates (i.e., predicts) the landing distance, D, of the aircraft 122 according to the following equation (1):

$$D = S_1 + S_{flare} + S_{ground} \qquad (1)$$

As shown in FIG. 2, $S_1$ is the horizontal ground distance measured along the runway 124 from the threshold point 130 to the flare point 132. Also, $S_{flare}$ is the horizontal ground distance from the flare point 132 to the touchdown point 134 and represents the horizontal ground distance through which the flare maneuver is executed. $S_{ground}$ is the horizontal ground distance from the touchdown point 134 to the completion point 136 and, thus, represents the distance travelled by the aircraft 122 during the landing (i.e., braking) phase.

Also, in some embodiments, the processor 108 may determine (i.e., predict) $S_{ground}$ (i.e., braking distance) using the following equation (2):

$$S_{ground} = Vt + At^2/2 \qquad (2)$$

In this equation, V represents the predicted velocity of the aircraft at touchdown. Also, t represents time for traveling from the touchdown point 134 to the completion point 136. Moreover, A represents the predicted acceleration (i.e. deceleration) of the aircraft 122 from the touchdown point 134 to the completion point 136. The value for A may be saved in the data storage device 120 and may correspond to typical performance data for the aircraft 122 when landing on the particular runway 124 under various conditions (e.g., dry or wet runway surfaces). When the aircraft 122 touches down on the runway 124, the predicted value for A may be replaced with the realtime acceleration measured by onboard accelerometers. The value for V is a predicted aircraft ground speed based on the current ground speed and the aircraft relative position to the touch down point. As the aircraft touches down on runway, this number can be replaced by the realtime value as measured by velocity sensors.

The processor 108 may determine (i.e., predict) the flare distance $S_{flare}$ using the following equation (3):

$$S_{flare} = V * k_t \qquad (3)$$

In this equation, V represents the predicted aircraft ground speed. The value for V may be predicted based on the typical performance data for the aircraft 122. Also, the constant $k_t$ may be of any value. For example, $k_t$ may be seven seconds (7 s) for typical maneuvers.

Additionally, the processor 108 may determine (i.e., predict) the distance $S_1$ using the difference in predicted threshold crossing height to the standard approach crossing height for an approach angle T. In other words the distance S1 may be determined using the following equation (4):

$$S1 = (H_{predicted} - H_{nominal})/\tan T \quad (4)$$

In this equation, $H_{predicted}$ represents the predicted threshold crossing height (based on the actual flight path 126). In FIG. 2, $H_{predicted}$ is indicated at 138 as the vertical height from the runway 124 to the threshold point 130. $H_{nominal}$ represents a predetermined, standard threshold crossing height. In FIG. 2, $H_{nominal}$ is indicated at 139 as the vertical height from the runway 124 to the nominal threshold point 131. T represents an effective approach angle of the aircraft 122. It is noted that equation (4) represents a general relationship for S1, where a higher crossing height and a smaller approach angle results in larger landing distance. As aircraft may not follow a straight approach path but usually stays close to the path, equation (4) provides a close approximation for determining a typical relationship of the distance S1, hence total landing distance, to the approach angle T. In general, S1 is inversely proportional to T and proportional to crossing height differences, not necessarily linearly, with linear equation (4) as good approximation.

As will be explained in detail with reference to FIGS. 3-6, the system 100 is configured to determine the effective approach angle T of the aircraft 122. In some embodiments, this effective angle T may be used to determine S1 according to equation (4) above.

In some situations, the system 100 may determine the effective approach angle T as being closer to the actual approach angle 142 measured between the runway 124 and the actual flight path 126 of the aircraft 122. In other situations, the system 100 may determine the effective approach angle T as being closer to a predetermined, nominal approach angle that is measured between the runway 124 and a predetermined flight path. In still other scenarios, the system 100 may determine the effective approach angle T partly based on the actual approach angle 142 and partly based on the predetermined, nominal approach angle.

Specifically, in some embodiments, the processor 108 may determine the effective approach angle T based on the following equation:

$$T = (1-B)T_{nominal} + B\, T_{actual} \quad (5)$$

In this equation, $T_{nominal}$ is a predetermined approach angle. Also, $T_{actual}$ is an actual or real-time approach angle of the aircraft's flight path relative to the runway 124. The factor B is a weighing factor (i.e., blending factor) applied to both variables.

More specifically, in some embodiments, $T_{nominal}$ may be the geometric approach angle from the MAP point 128 to the touchdown point 134 relative to the runway 124. In additional embodiments, $T_{nominal}$ may be the visual approach angle typically defined for the approach runway. $T_{nominal}$ may be stored in a lookup table or chart in the data storage element 120. Also, $T_{nominal}$ may be defined according to a lighting installation, precision approach path indicator (PAPI), or visual approach slope indicator (VASI).

Also, $T_{actual}$ may be obtained from detected data from sensors or other components of the avionics system 118. For example, $T_{actual}$ may be obtained via an onboard inertial reference system of the avionics system 118 that provides the real-time output of approach angle 142 during decent of the aircraft 122.

The weighing factor B may range between a value of zero and one. Thus, it will be understood that a higher weighing factor (i.e., closer to 1) will cause the effective approach angle T to be closer to $T_{actual}$. Conversely, a lower weighing factor (i.e., closer to zero) will cause the effective approach angle T to be closer to $T_{nominal}$. In some embodiments, the weighing factor B can have a default value of 0.5. As such, the effective approach angle T will be equally affected by $T_{nominal}$ and $T_{actual}$. However, the processor 108 may adjust the weighing factor B according to one or more factors. In some embodiments, the processor 108 may adjust the weighing factor B on a case-by-case basis for a particular landing phase. Specifically, in some embodiments, the processor 108 can adjust the weighing factor B based on a comparison between the actual approach profile of the aircraft 122 and a predetermined approach profile.

Figure 3:
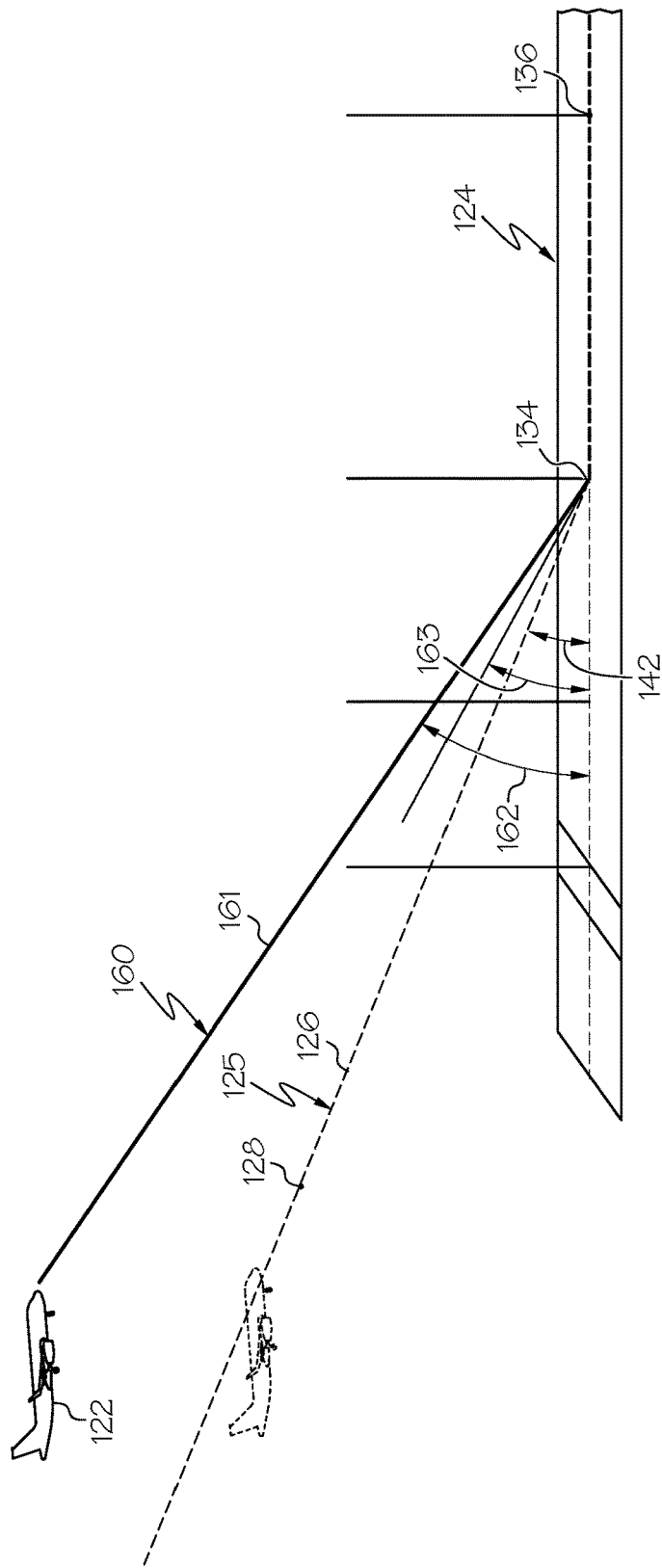
FIG. 3 is a schematic side view showing an aircraft approach profile according to a first scenario, wherein the approach profile of FIG. 2 is superimposed therein.
Figure 4:
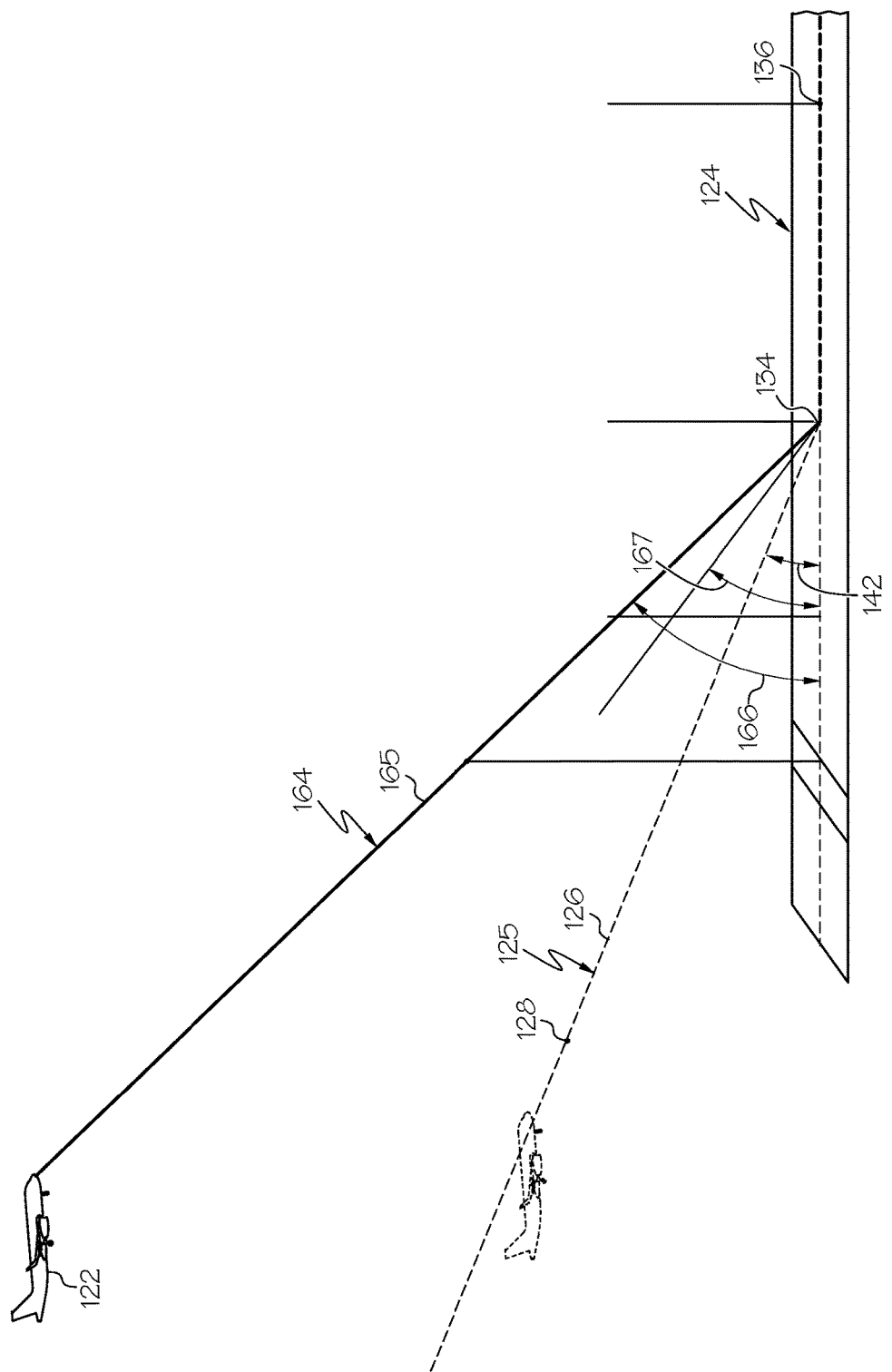
FIG. 4 is a schematic side view showing an aircraft approach profile according to a second scenario, wherein the approach profile of FIG. 2 is superimposed therein.
Figure 5:
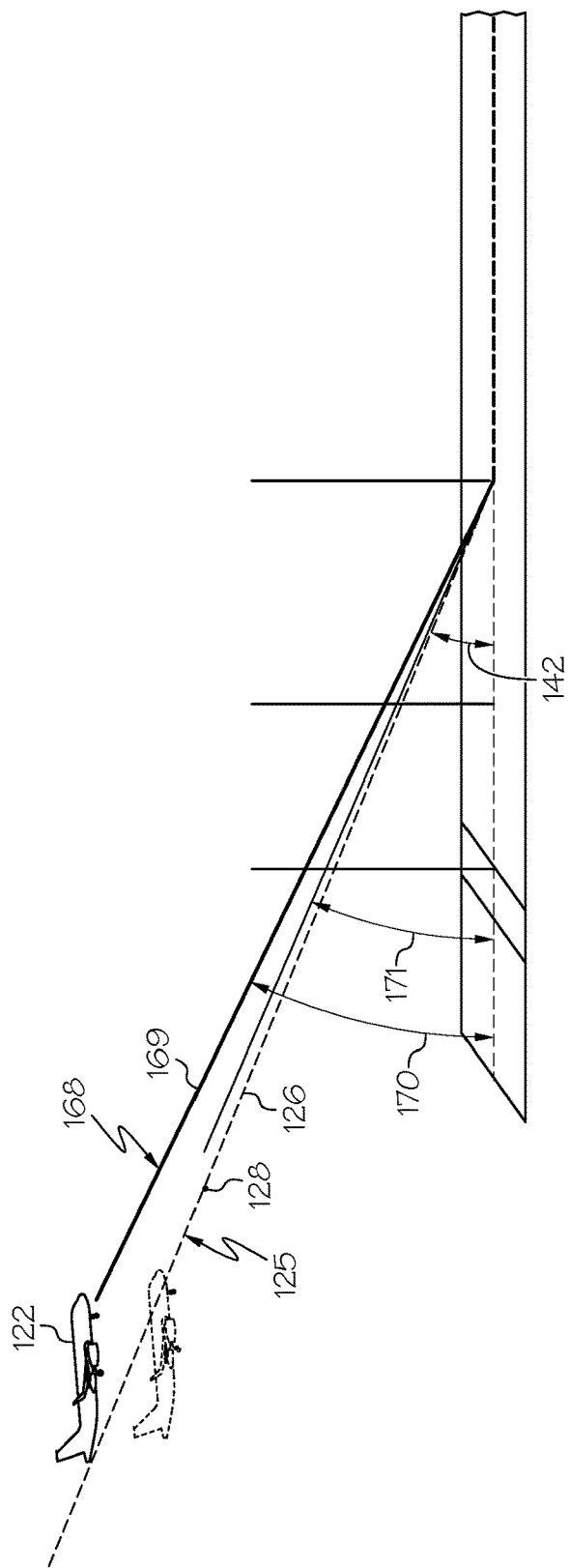
FIG. 5 a schematic side view showing an aircraft approach profile according to a third scenario, wherein the approach profile of FIG. 2 is superimposed therein.
Figure 6:
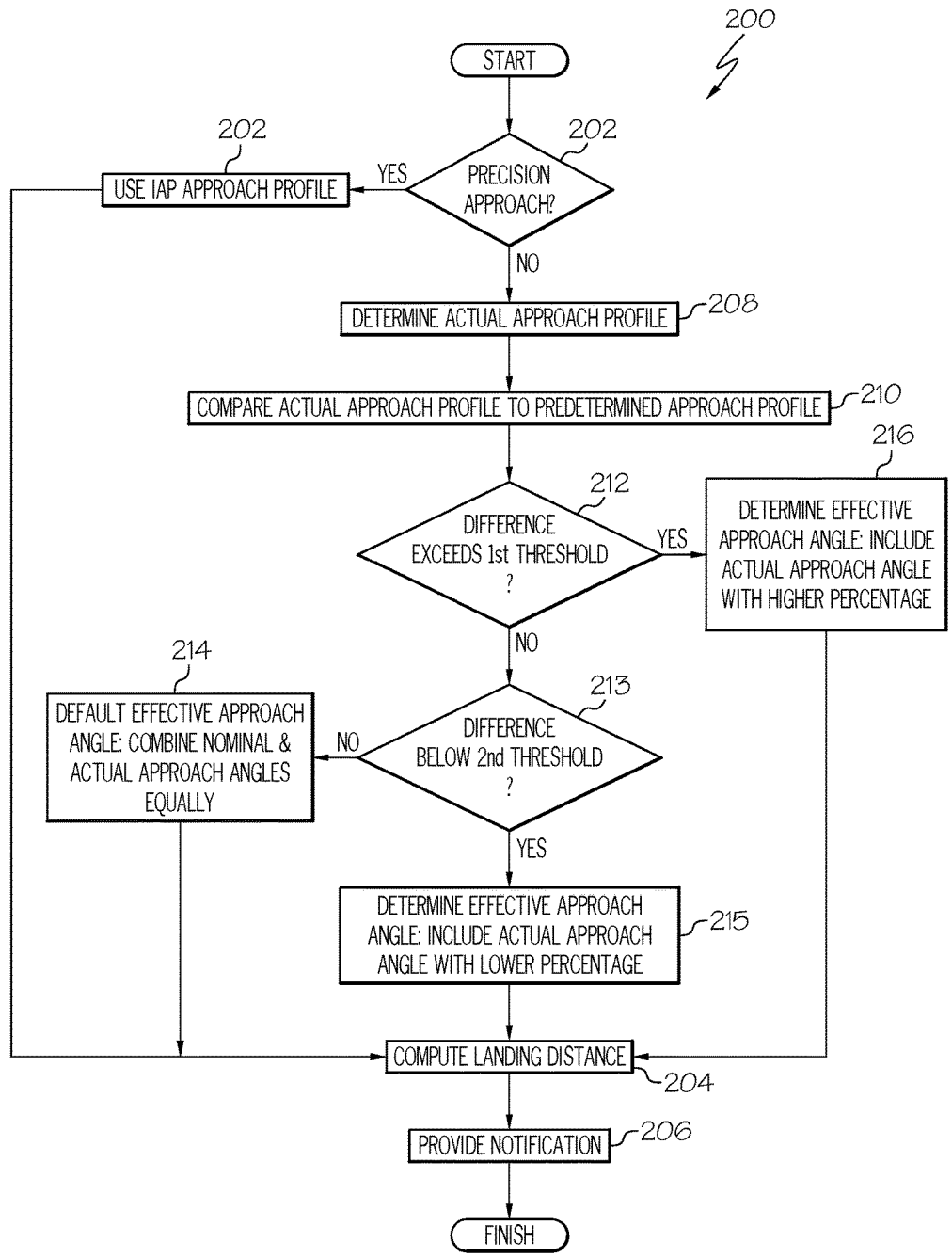
FIG. 6 is a flowchart illustrating a method of operating the system of FIG. 1 according to example embodiments of the present disclosure.

A method 200 used by the system 100 for determining an effective approach angle T will now be discussed with reference to FIGS. 3-6. FIGS. 3, 4, and 5 illustrate the aircraft 122 landing with different approach profiles. FIG. 6 shows a flowchart that represents the method 200 according to exemplary embodiments.

In FIG. 3, the approach profile of the aircraft 122 is represented by a line 160. In this first approach profile 160, the aircraft 122 has a first flight path 161 having a first approach angle 162. In FIG. 4, the approach profile 164 of the aircraft 122 is represented by a second flight path 165 having a second approach angle 166. In FIG. 5, the approach profile 168 of the aircraft 122 is represented by a third flight path 169 having a third approach angle 170.

The approach profile 125 of FIG. 2 is superimposed in FIGS. 3, 4, and 5 for reference and, here, represents a predetermined or nominal approach profile. Thus, the predetermined approach profile 125 is represented by flight path 126 having the nominal approach angle 142. In some embodiments, the predetermined approach profile 125 (including the flight path 126 and other parameters of the associated approach profile) may be based on predetermined instrument approach procedures that are stored within the data storage element 120.

FIG. 3 represents an example scenario in which the actual approach profile 160 is similar to the predetermined approach profile 125. This similarity may be quantified by a comparison of the actual approach angle 162 and the predetermined approach angle 142. The approach profile 160 may also have an airspeed and/or other associated parameters that are similar to the predetermined approach profile 125. The actual approach angle 162 may be within a predetermined first threshold (e.g., within +/−3 degrees) but outside a predetermined second threshold (e.g., within +/1 degree) relative to the predetermined approach angle 142. Accordingly, the processor 108 may set the weighing factor B (of equation (5)) at a value of 0.5. As a result, the effective approach angle 163 determined by the processor 108 (i.e., T of equation (4)) may be approximately halfway between the actual approach angle 162 and the predetermined approach angle 142.

FIG. 4 may represent a second scenario in which there is a larger difference between the actual and predetermined approach profiles 160, 125. In comparison with FIG. 3, the actual approach angle 166 of FIG. 4 is greater than the predetermined approach angle 142. The difference between the actual approach angle 166 and the predetermined approach angle 142 may be outside both of the predetermined first and second thresholds. Accordingly, as shown in FIG. 4, the processor 108 may set the weighing factor B (of equation (5)) at a value that is higher than 0.5. Thus, the effective approach angle 167 may be closer to the actual approach angle 166. In some embodiments, the higher the difference between the actual approach angle 166 and the predetermined approach angle 142, the closer the weighing factor B will be to one.

FIG. 5 may represent a third scenario in which there is a smaller difference between the actual and predetermined profiles 168, 125. In comparison with FIG. 3, the actual approach angle 170 of FIG. 5 is closer to the predetermined approach angle 142. The difference between the actual approach angle 166 and the predetermined approach angle 142 may be within both the first and second thresholds. Accordingly, as shown in FIG. 5, the processor 108 may set the weighing factor B (of equation (5)) at a value that is lower than 0.5. Thus, the effective approach angle 171 may be closer to the nominal approach angle 142. In some embodiments, the lower the difference between the actual approach angle 170 and the predetermined approach angle 142, the closer the weighing factor B will be to zero.

A method 200 of determining the effective approach angle, of determining a landing distance for the aircraft 122, and of providing output related to the predicted parameter(s) is further illustrated in the flowchart of FIG. 6. The method 200 may begin at 202, in which the processor 108 determines whether the current landing is to be a precision approach or a non-precision approach. In some embodiments, the system 100 allows the user to manually select either a precision approach or a non-precision approach. The input device 104 may be used to make this manual selection in some embodiments. If the precision approach is selected, then, the method 200 continues at 202, wherein the system 100 relies on instrument approach procedures (IAP) for the approach and landing. The IAP procedures may be stored in the data storage element 120.

Then, the method 200 may continue to 204, wherein the processor 108 uses the approach angle defined by the IAP parameters to calculate the S1 distance as well as the $S_{flare}$ and $S_{ground}$ distances discussed above.

Next, the method 200 may continue at 206, wherein the system 100 provides a notification to the pilot, crewmember, air traffic control personnel, or another user. The notification may be of various types and may be provided via the display 102, the audio output device 106, and/or the tactile output device 105. For example, the processor 108 may send control signals to the display 102 so that a visual representation of the predicted landing distance is displayed to the pilot and/or another crew member. Also, in some embodiments, the processor 108 may receive input from the avionics system 118 regarding the actual parameters (e.g., trajectory, airspeed, etc.) and send control signals to the display 102 to output an alarm if those actual parameters are significantly different from the IAP parameters. Similarly, the processor 108 may cause the audio output device 106 to emit an audible alarm and/or the processor 108 may cause the tactile output device 105 to emit a tactile alarm if the actual parameters are significantly different from the IAP parameters. Such alarm(s) and alert(s) may be provided continuously or intermittently, depending on whether the deviation from the IAP parameters continues.

The method 200 may finish once the aircraft 122 lands (e.g., the aircraft 122 reaches the completion point 136). In some embodiments, data from the landing may be stored in the data storage element 120 for future reference.

If, at 202 it is determined that the approach is a non-precision approach, the method 200 may continue at 208, wherein the actual approach profile of the aircraft 122 is determined. Specifically, in some embodiments, the processor 108 may receive data from the avionics system 118 to determine the actual flight path, the actual airspeed, the actual trajectory, and/or other parameters of the approach profile of the aircraft 122.

Then, at 210, the actual approach profile of the aircraft 122 may be compared to the predetermined approach profile. In the case of FIG. 3, the actual approach profile 160 is compared to the predetermined approach profile 125, and a difference between the two is determined. In the actual approach profile 164 is compared to the predetermined approach profile 125, and a difference between the two is determined. In the case of FIG. 5, the actual approach profile 168 is compared to the predetermined approach profile 125, and a difference between the two is determined.

The method 200 may continue at 212, wherein the processor 108 determines whether the difference between the actual approach profile and the predetermined approach profile exceeds a first threshold. As an example, the first threshold may be +/−3 degrees between the actual approach angle and the predetermined approach angle. If not, then, the method 200 may continue to 213, wherein the processor 108 determines whether the difference between the actual approach profile and the predetermined profile is below a second threshold. As an example, the second threshold may be +/−1 degree between the actual approach angle and the predetermined approach angle.

If the decision of 213 is answered negatively, the weighing factor B may remain at the default value of 0.5. Accordingly, the processor 108 may equally factor in the predetermined approach angle and the actual approach angle when determining the effective approach angle. This scenario is represented in FIG. 3.

If the decision of 213 is answered positively, the processor 108 may set the weighing factor B to a value that is lower than the default value and that is closer to zero. Accordingly, the effective approach angle will be closer to the predetermined approach angle. This scenario is represented in FIG. 5.

If the decision of 212 is answered positively, the processor 108 may set the weighing factor B to a value that is higher than the default value and that is closer to one. Accordingly, the effective approach angle will be closer to the actual approach angle. This scenario is represented in FIG. 4.

As shown in FIG. 6, the method 200 can proceed to 204. At 204, the landing distance of the aircraft 122 can be computed, using the effective approach angle determined at 214, 215, or 216. In some embodiments, equations (1), (2), (3), (4), and (5) listed above may be used to compute the landing distance.

Next, at 206, the system 100 may provide notification to the pilot, crewmember, air traffic control personnel, or another user. The notification may be of various types and may be provided via the display 102, the audio output device 106, and/or the tactile output device 105. For example, the processor 108 may send control signals to the display 102 so that a visual representation of the landing distance computed at 204 is displayed to the pilot and/or another crew member.

Also, in some embodiments of 206, the system 100 may continuously monitor the actual approach profile (e.g., trajectory, airspeed, etc.) during the approach and landing. With this data, the system 100 may continuously update the predicted landing distance. If a difference between the updated landing distance and the landing distance predicted at 204 exceeds a predetermined threshold, then a visual, audio, and/or tactile alarm may be provided.

It will be appreciated that the method 200 may vary from the embodiments illustrated in FIG. 6. For example, in some embodiments, the method 200 may allow the user to select the weighing factor B of equation (5). This, in effect, would allow the user to select whether to rely more on the actual approach angle or more on the predetermined approach angle when the processor 108 determines the effective approach angle. The method 200 can vary in other ways as well without departing from the scope of the present disclosure.

Accordingly, the system 100 and its method 200 of operation can be used to determine and predict the landing distance with a high degree of accuracy. For example, even if the altitude of the aircraft 122 fluctuates to a large degree during the landing phase (thereby changing the flight path 126), the system 100 can still accurately determine and predict the landing distance. Also, the system 100 and its method 200 of operation may be useful in a wide variety of landing situations and aircraft types.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A method of predicting a landing distance, the method comprising:
    detecting an actual approach profile of the aircraft, the actual approach profile including an actual approach angle, $T_{actual}$;
    comparing, by a processor, the actual approach profile to a predetermined approach profile to determine a difference between the actual and predetermined approach profiles, the predetermined approach profile including a predetermined approach angle, $T_{nominal}$;
    determining, by the processor, a value between zero and one for a variable factor, B, according to the determined difference between the actual and predetermined approach profiles;
    determining, by the processor, an effective approach angle, T, according to:

$$T=(1-B)T_{nominal}+B\,T_{actual}$$

determining, by the processor, the predicted landing distance according to the determined effective approach angle, T.

2. The method of claim 1, further comprising outputting a notification based on the predicted landing distance.

3. The method of claim 2, wherein the notification is a visual notification.

4. The method of claim 2, wherein the notification includes each of a visual notification, an audible notification, and a tactile notification.

5. The method of claim 1, wherein determining the predicted parameter includes determining a predicted landing distance of the aircraft;
    wherein the landing distance includes an S1 distance; and
    further comprising determining the S1 distance as inversely proportional to T and proportional to $(H_{predicted}-H_{nominal})$;

wherein $H_{predicted}$ is a predicted threshold crossing height and $H_{nominal}$ is a predetermined, standard threshold crossing height.

6. The method of claim 1, further comprising:
    determining, by the processor:
        whether the difference between the actual and predetermined approach profiles is within a predetermined first threshold; and
        whether the difference between the actual and predetermined approach profiles is within a predetermined second threshold, wherein the second threshold represents a smaller difference between the actual and predetermined approach profiles than the first threshold;
    setting the variable factor, B, so that the effective approach angle, T, is approximately half way between the actual approach angle, $T_{actual}$, and the predetermined approach angle, $T_{nominal}$, when the difference exceeds the second threshold and when the difference is within the first threshold;
    setting the variable factor, B, so that the effective approach angle, T, is closer to the predetermined approach angle, $T_{nominal}$, than the actual approach angle, $T_{actual}$, e when the difference is within both the first and second thresholds; and
    setting the variable factor, B, so that the effective approach angle, T, is closer to the actual approach angle, $T_{actual}$, profile than the predetermined approach angle, $T_{nominal}$, when the difference is outside both the first and second thresholds.

7. A system for predicting a landing distance for an aircraft, the system comprising:
    an avionics system configured to detect an actual approach profile of the aircraft, the actual approach profile including an actual approach angle $T_{actual}$; and
    a processor that is configured to:
        compare the actual approach profile to a predetermined approach profile to determine a difference between the actual and predetermined approach profiles, the predetermined approach profile including a predetermined approach angle $T_{nominal}$;
        determine a value between zero and one for a variable factor, B, according to the determined difference between the actual and predetermined approach profiles;
        determine an effective approach angle, T, for the aircraft according to:

$$T=(1-B)T_{nominal}+B\,T_{actual}$$

determine the predicted parameter based on the effective approach angle, T.

8. The system of claim 7, further comprising at least one output device that is configured to provide a notification to a user, the notification relating to the predicted landing distance.

9. The system of claim 8, wherein the at least one output device includes a display that is configured to provide a visual notification to the user.

10. The system of claim 8, wherein the at least one output device includes a visual output device configured to provide a visual notification to the user, an audio output device configured to provide an audible notification to the user, and a tactile output device configured to provide a tactile notification to the user.

11. The system of claim 7,
wherein the landing distance includes an S1 distance; and
wherein the processor is configured to determine the S1 distance according to:

$$S1=(H_{predicted}-H_{nominal})/\tan T$$

wherein $H_{predicted}$ is a predicted threshold crossing height and $H_{nominal}$ is a predetermined, standard threshold crossing height.

12. The system of claim 7, wherein the processor is configured to:
determine whether the difference between the actual and predetermined approach profiles is within a predetermined first threshold;
determine whether the difference between the actual and predetermined approach profiles is within a predetermined second threshold, wherein the second threshold represents a smaller difference between the actual and predetermined approach profiles than the first threshold;
set the variable factor, B, so that the effective approach angle, T, is approximately half way between the actual approach angle, $T_{actual}$, and the predetermined approach angle, $T_{nominal}$, when the difference exceeds the second threshold and when the difference is within the first threshold;
set the variable factor, B, so that the effective approach angle, T, is closer to the predetermined approach angle, $T_{nominal}$, profile than the actual approach angle, $T_{actual}$, when the difference is within both the first and second thresholds; and
set the variable factor, B, so that the effective approach angle, T, is closer to the actual approach angle, $T_{actual}$, than the predetermined approach angle, $T_{nominal}$, when the difference is outside both the first and second thresholds.

13. A method of predicting a landing distance of an aircraft, the method comprising:
detecting an actual approach profile of the aircraft, the actual approach profile including an actual approach angle, $T_{actual}$;
comparing, by a processor, the actual approach profile to a predetermined approach profile to determine a difference between the actual and predetermined approach profiles, the predetermined approach profile including a predetermined approach angle, $T_{nominal}$;
determining, by the processor:
whether the difference between the actual and predetermined approach profiles is within a predetermined first threshold; and
whether the difference between the actual and predetermined approach profiles is within a predetermined second threshold, wherein the second threshold represents a smaller difference between the actual and predetermined approach profiles than the first threshold;
determining, by the processor, an effective approach angle, T, for the aircraft based on both the actual approach angle, $T_{actual}$, and the predetermined approach angle $T_{nominal}$; and
determining, by the processor, the predicted landing distance based on the effective approach angle T;
wherein determining the effective approach angle, T, includes determining the effective approach angle, T, according to:

$$T=(1-B)T_{nominal}+B\,T_{actual}$$

wherein the processor determines the variable factor, B, according to the difference between the actual and predetermined approach profiles, including:
setting the variable factor so that the effective approach angle is approximately half way between the actual approach angle and the predetermined approach angle when the difference exceeds the second threshold and when the difference is within the first threshold;
setting the variable factor so that the effective approach angle is closer to the predetermined approach profile than the actual approach profile when the difference is within both the first and second thresholds; and
setting the variable factor so that the effective approach angle is closer to the actual approach profile than the predetermined approach profile when the difference is outside both the first and second thresholds.

14. The method of claim 13, wherein the landing distance includes an S1 distance; and
further comprising determining the S1 distance according to:

$$S1=(H_{predicted}-H_{nominal})/\tan T$$

wherein $H_{predicted}$ is a predicted threshold crossing height and $H_{nominal}$ is a predetermined, standard threshold crossing height.

15. The method of claim 13, further comprising outputting a notification based on the predicted landing distance.

* * * * *